United States Patent
Honda et al.

(10) Patent No.: US 7,660,370 B2
(45) Date of Patent: Feb. 9, 2010

(54) WIRELESS TERMINAL APPARATUS, CONTROL METHOD FOR WIRELESS BASE STATION AND CONTROL METHOD FOR WIRELESS TERMINAL APPARATUS

(75) Inventors: Atsushi Honda, Kawasaki (JP); Yuuta Nakaya, Kawasaki (JP); Michiharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 622 days.

(21) Appl. No.: 11/475,960

(22) Filed: Jun. 28, 2006

(65) Prior Publication Data

US 2007/0223603 A1 Sep. 27, 2007

(30) Foreign Application Priority Data

Mar. 24, 2006 (JP) ............................. 2006-084024

(51) Int. Cl.
*H04L 27/06* (2006.01)
(52) U.S. Cl. .................. 375/340; 375/260; 375/346; 370/206; 370/208
(58) Field of Classification Search ............... 375/260, 375/340; 370/206, 208, 210
See application file for complete search history.

(56) References Cited

U.S. PATENT DOCUMENTS

| | | | |
|---|---|---|---|
| 6,973,395 B2 * | 12/2005 | Yoshizawa et al. | 702/76 |
| 7,397,859 B2 * | 7/2008 | McFarland | 375/260 |
| 2003/0081695 A1 * | 5/2003 | Eilts et al. | 375/316 |
| 2005/0180313 A1 * | 8/2005 | Kim et al. | 370/208 |
| 2007/0242600 A1 * | 10/2007 | Li et al. | 370/210 |

FOREIGN PATENT DOCUMENTS

| | | |
|---|---|---|
| JP | A-H11-346203 | 12/1999 |
| JP | A-2005-244958 | 9/2005 |

* cited by examiner

*Primary Examiner*—David C Payne
*Assistant Examiner*—Leon Flores
(74) *Attorney, Agent, or Firm*—Hanify & King, PC

(57) ABSTRACT

The present invention provides a wireless terminal apparatus, including a reception unit for receiving a multi-carrier signal generated by applying an N-point (where N is a natural number) inverse fast Fourier transform (IFFT) to a plurality of sub-carriers to which transmission information for a plurality of wireless terminal apparatuses is allocated; a fast Fourier transform unit for extracting a plurality of the sub-carriers from the multi-carrier signal; a thin-out unit, being placed at the front stage of the fast Fourier transform unit, capable of changing, from the N points, a sampling number of the multi-carrier signals which are digitalized; and a judgment unit for discerning, based on sub-carrier allocation information accompanying the multi-carrier signal, whether or not the sub-carrier of another wireless terminal apparatus overlaps with that of the wireless terminal apparatus itself in the case of changing the sampling number from the N points, and determining a sampling number for the thin-out unit.

9 Claims, 25 Drawing Sheets

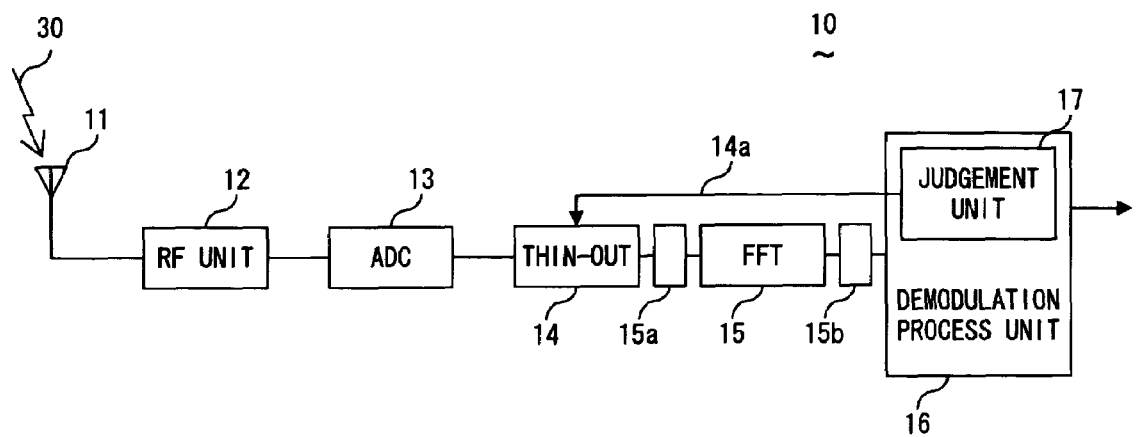
F I G. 1

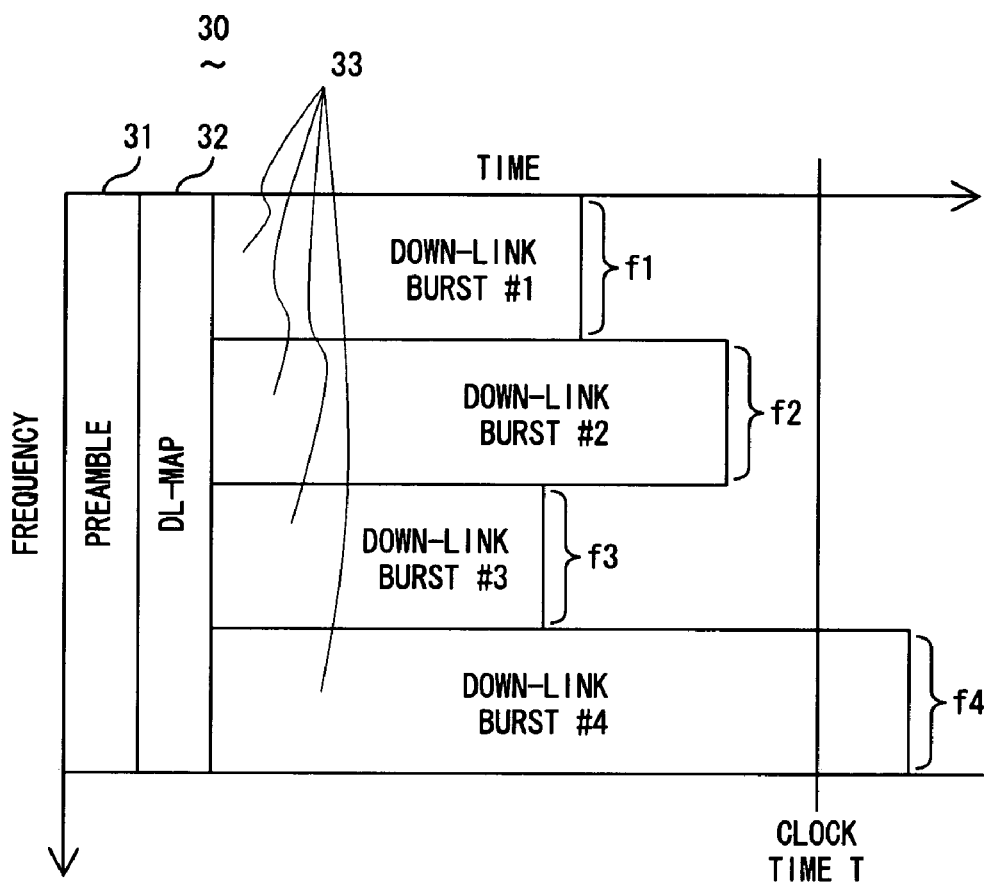
F I G. 3

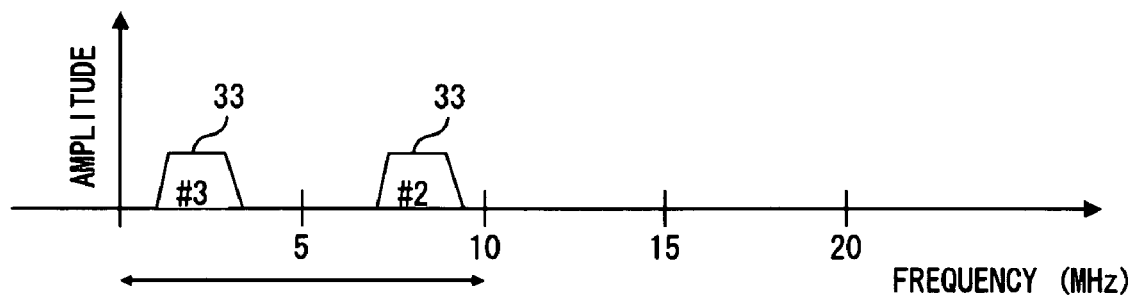
F I G. 8

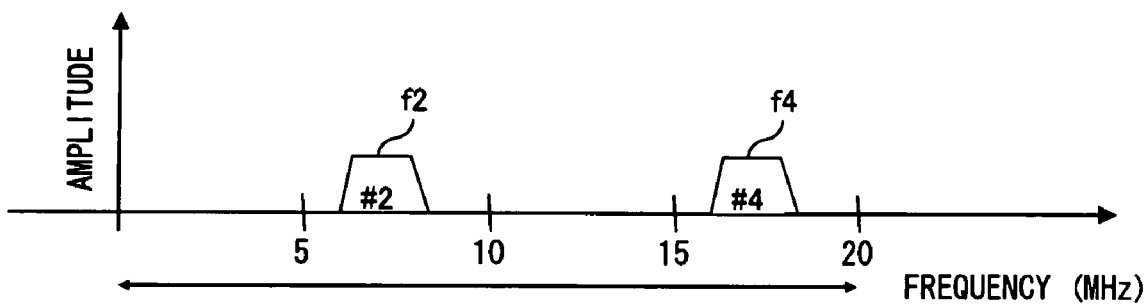
F I G. 9

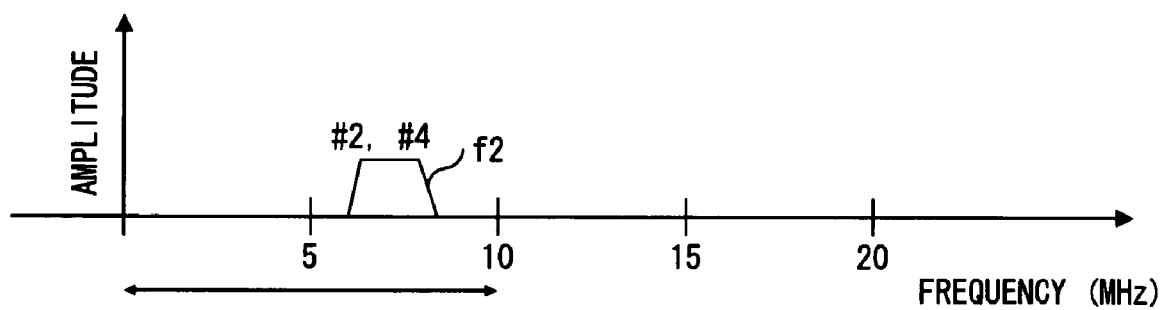
F I G. 1 0

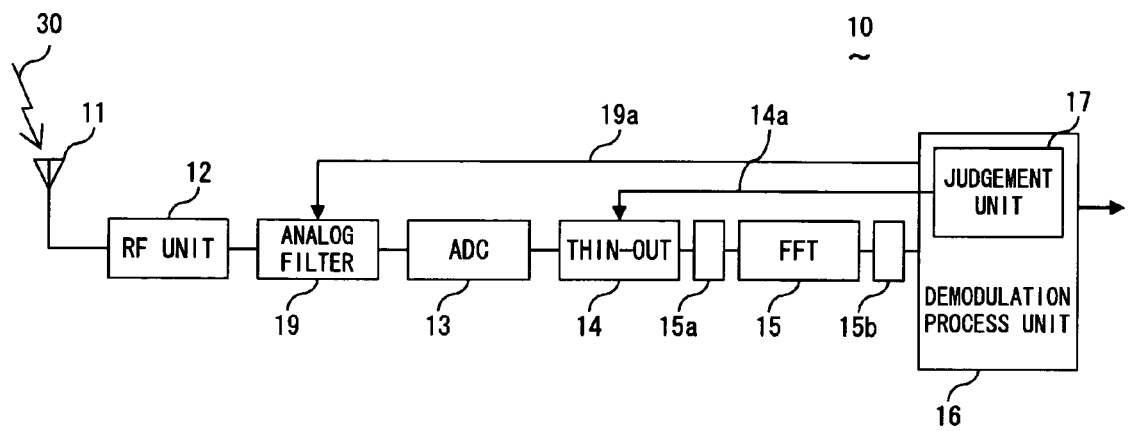
F I G. 1 2

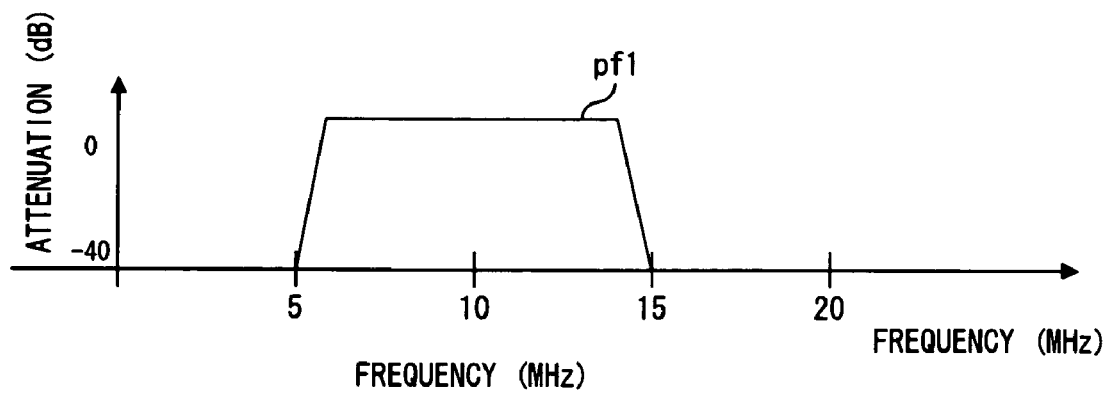
F I G. 1 3

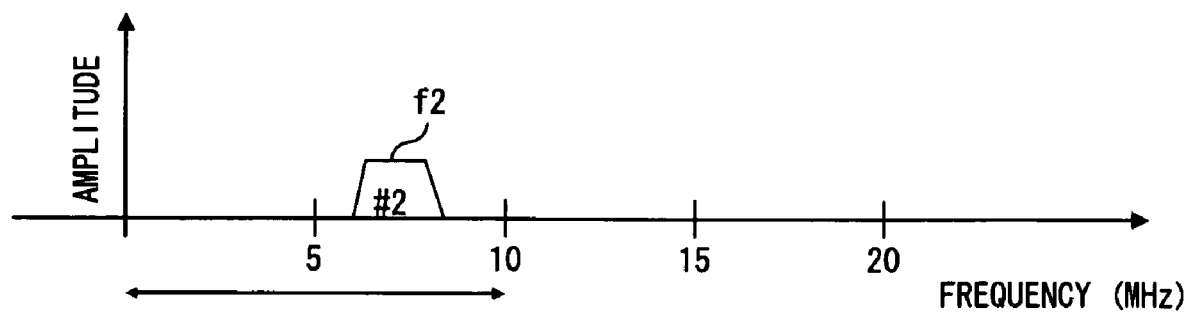
F I G. 1 4

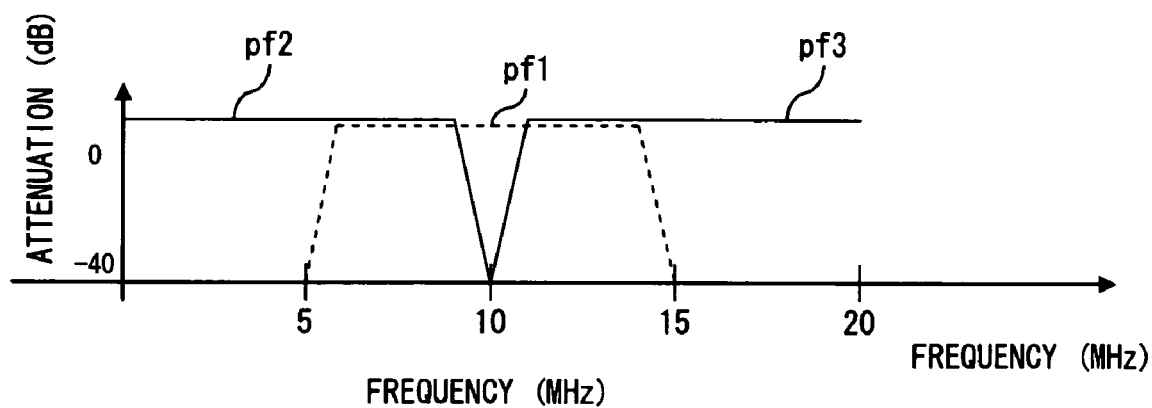
F I G. 1 5

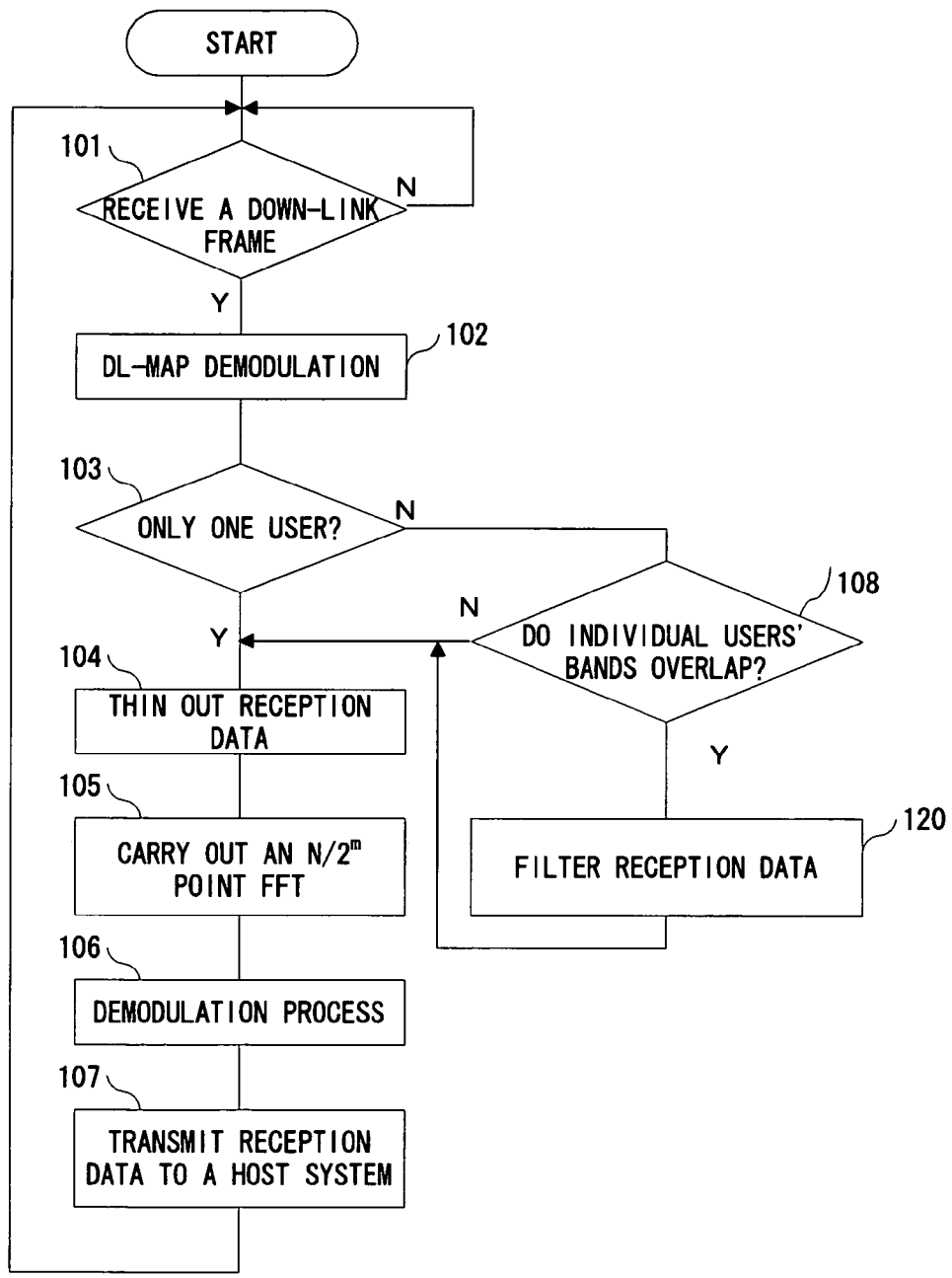
F I G. 17

WIRELESS TERMINAL APPARATUS, CONTROL METHOD FOR WIRELESS BASE STATION AND CONTROL METHOD FOR WIRELESS TERMINAL APPARATUS

BACKGROUND OF THE INVENTION

1. Field of the Invention

The present invention relates to a wireless terminal apparatus, a control method for a wireless base station and a control method for a wireless terminal apparatus; and to a technique effectively applicable to a wireless transmission and reception technique for use in a wireless telecommunications system performing a fast Fourier transform (FFT) in a signal process for transmission and reception, such as an Orthogonal Frequency Division Multiple Access (OFDMA), for example.

2. Description of the Related Art

The OFDMA transmission system allocates one or a plurality of sub-carriers to each user (i.e., a terminal receiver) for carrying out telecommunications between a base station and a plurality of users as noted in a patent document 1 for example. Let it be considered the case of generating an OFDMA signal by an N-point inverse fast Fourier transform (IFFT) at a base station and a terminal receiver which receives the signal for example. The terminal receiver applies a fast Fourier transform (FFT) to a received time signal for converting to a signal of a frequency range, selects a sub-carrier signal in a band allocated to the terminal receiver itself and carries out a subsequent sub-carrier demodulation process. Therefore, the terminal receiver applies an FFT to time signals in the lump including data addressed to a plurality of users.

In the case of an OFDMA signal of an N-point IFFT size being generated at a transmitter (i.e., the base station), the receiver also performs an N-point FFT. If the receiver performs an FFT of less than N points (e.g., N/2, N/4, and so on), a sub-carrier allocated to the receiver itself is overlapped with that of another user, disabling a normal reception.

However, in the case of a base station generating a signal of a large FFT size (e.g., N=2048 points) and transmitting it, a receiver also performing an FFT of the same size is faced with a technical problem of increasing an FFT operation volume and calculation time, and the resultant power consumption, at the terminal receiver.

The above described technique disclosed by the patent document 1 exists as a conventional technique for reducing a power consumption associated with an FFT. The technique according to the aforementioned patent document 1 rearranges sub-carriers of a transmission signal in an interval of an nth power of two ("2") followed by applying an inverse Fourier transform when telecommunications traffic is light, thereby making it possible to reduce the IFFT size of the transmission signal and apply an FFT in the same number of points as an IFFT at the transmission side also at the time of receiving the aforementioned transmission signal. By so doing, the number of points of an FFT within a transmission and reception system is tried to be reduced.

The technique according to the patent document 1, however, needs to rearrange sub-carriers of the users in the interval of an nth power of two ("2") (i.e., arrange them alternately) in order to reduce the number of FFT points at the transmitter side, and therefore the technique according to the patent document 1 cannot be utilized in the case of allocating, and transmitting, an adjacent sub-carrier to each user. Besides, if a base station transmits in N/2 points for example, becoming the same N/2 points at the receiving side, and therefore the receiver is unable to change it to an FFT size of N/4 points or N/8 points, i.e., being less than that of the transmission side.

Meanwhile, a patent document 2 has disclosed a technique, for use in a wireless reception apparatus, judging a propagation path condition in the entire range of a usage frequency band of a multi-carrier signal received from a base station, identifying a frequency band having a good propagation path condition from among a usage frequency band of OFDM and notifying the base station of it, thereby attempting to accomplish reductions of a telecommunication data volume for a frequency scheduling and of a power consumption of the wireless reception apparatus.

The technique, however, does not refer to a change of FFT sizes at the wireless reception apparatus.

[Patent document 1] Laid-Open Japanese Patent Application Publication No. 11-346203

[Patent document 2] Laid-Open Japanese Patent Application Publication No. 2005-244958

SUMMARY OF THE INVENTION

A purpose of the present invention is to provide a technique enabling the reductions of an operation volume, a calculation time and a power consumption which are associated with a fast Fourier transform (FFT) in a reception process for a multi-carrier signal at a wireless terminal apparatus.

Another purpose of the present invention is to provide a technique enabling the reductions of an operation volume, a calculation time and a power consumption which are associated with a fast Fourier transform (FFT) in a reception process for a multi-carrier signal at a wireless terminal apparatus without being affected by transmission information to a plurality of wireless terminal apparatuses or an allocation method of a plurality of sub-carriers.

Yet another purpose of the present invention is to provide a technique enabling an accomplishment of an improvement of reception sensitivity in a reception process for a multi-carrier signal in a wireless terminal apparatus.

A first aspect of the present invention is to provide a wireless terminal apparatus, including a reception unit for receiving a multi-carrier signal generated by applying an N-point (where N is a natural number) inverse fast Fourier transform (IFFT) to a plurality of sub-carriers to which transmission information for a plurality of wireless terminal apparatuses is allocated; a fast Fourier transform unit for extracting a plurality of the sub-carriers from the multi-carrier signal; a thin-out unit, being placed at the front stage of the fast Fourier transform unit, capable of changing, from the N points, a sampling number of the multi-carrier signals which are digitalized; and a judgment unit for discerning, based on sub-carrier allocation information accompanying the multi-carrier signal, whether or not the sub-carrier of another wireless terminal apparatus overlaps with that of the wireless terminal apparatus itself in the case of changing the sampling number from the N points, and determining a sampling number for the thin-out unit.

A second aspect of the present invention is to provide a control method for a wireless base station generating a multi-carrier signal and transmitting it to a wireless terminal apparatus by applying an N-point (where N is a natural number) inverse fast Fourier transform (IFFT) to a plurality of sub-carriers to which transmission information to a plurality of wireless terminal apparatuses is allocated, wherein the control method makes the wireless base station carry out at least one of a first allocation method for allocating the transmission information to a plurality of sub-carriers so as to avoid an overlap of a loop signal thereof when changing a sampling number from the N points at the time of extracting the sub-carriers by applying a fast Fourier transform (FFT) to the multi-carrier signal in the wireless terminal apparatus, and a second allocation method for allocating the same transmission information to a plurality of sub-carriers which become loop signals relative thereto when changing a sampling number from the N points at the time of extracting the sub-carriers by applying a fast Fourier transform (FFT) to the multi-carrier signal in the wireless terminal apparatus.

A third aspect of the present invention is to provide a control method for a wireless terminal apparatus, comprising a first step for receiving a multi-carrier signal generated by applying an N-point (where N is a natural number) inverse fast Fourier transform (IFFT) to a plurality of sub-carriers to which transmission information for a plurality of wireless terminal apparatuses is allocated; a second step for obtaining sub-carrier allocation information accompanying the multi-carrier signal; and a third step for changing a sampling number from the N points based on the sub-carrier allocation information when extracting a plurality of the sub-carriers by applying a fast Fourier transform (FFT) to the multi-carrier signal.

That is, the present invention is contrived so that a base station as an example applies an N-point inverse fast Fourier transform (IFFT) to each OFDMA symbol as transmission information and generates a transmission signal. A wireless terminal apparatus first demodulates a symbol including sub-carrier allocation information for a down-link signal for obtaining sub-carrier allocation information for the wireless terminal apparatus itself and another user, followed by judging whether or not the other user overlaps with a sub-carrier allocated to the wireless terminal apparatus itself when changing an FFT size to N/2 points based on the aforementioned sub-carrier allocation information. In the case of judging "no overlap", the wireless terminal apparatus thins out to N/2 samples for each symbol of subsequent down-link signals, converts them to parallel data by a serial/parallel conversion (S/P conversion), applies an N/2 point FFT thereto and converts it to serial data by a parallel/serial conversion (P/S conversion).

This configuration brings forth benefits as follows:

(1) An obtainment of sub-carrier allocation information transmitted from a base station makes it possible to judge whether or not an FFT size can be changed at a terminal. It is also possible to know as to what timing is appropriate for the FFT size being changed. There has been no such conventional system available;

(2) A utilization of a loop signal makes it possible to receive a signal transmitted through an N-point FFT by an N/2-point FFT. That is, if a transmission signal is applied by an N/2-point FFT, the reception is applied by an N/4-point FFT;

(3) A change of FFT sizes by receiving sub-carrier allocation information transmitted from the base station, enabling a utilization of it in a manner closed to the terminal side, and hence it provides high versatility; and (4) A utilization of a loop of a signal makes it possible to utilize it even in the cases of each user using an adjacent sub-carrier and of sub-carriers being placed alternately.

This case makes the numbers of thin-out at a receiver of the wireless terminal apparatus from N/2 to N/4, N/8 and so on (making the denominator the nth power of 2 (i.e., $2^m$, where m=1, 2, 3 and so on)).

This configuration makes a transmission signal looping a plurality of times, thus enabling a reception of a signal transmitted by an N-point IFFT by smaller FFT sizes, e.g., N/4, N/8 and so on.

Meanwhile, the base station applies an N-point inverse fast Fourier transform (IFFT) to each OFDMA symbol for generating a transmission signal. The wireless terminal apparatus first demodulates a symbol including sub-carrier allocation information of a down-link signal and obtains sub-carrier allocation information for the wireless terminal apparatus itself and another user. Then, it judges whether or not the other user is overlapped by a sub-carrier allocated to the apparatus itself if the FFT size is changed to N/2 points based on the aforementioned sub-carrier allocation information. If the judgment is "an overlap", it applies a band limit to subsequent down-link signals by way of an image removal filter. It then thins out to N/2 samples for each symbol which has been applied by a band limit, converts it into parallel data by a serial/parallel conversion (S/P conversion), applies an N/2-point FFT thereto and converts it into serial data by a parallel/serial conversion (P/S conversion).

This configuration attenuates the other user's signal overlapping with a sub-carrier allocated to the apparatus itself in the case of a receiver of the wireless terminal apparatus changing an FFT size, thereby enabling the reception of transmission information addressed to the apparatus itself securely.

In this case, the image removal filter can be constituted by a digital filter. The use of a digital filter for the image removal filter makes it possible to accomplish an image removal without increasing a complexity of a radio frequency (RF) analog signal process unit.

Alternatively, the image removal filter can be constituted by an analog filter. The use of an analog filter for the image removal filter makes it possible to accomplish an image removal without increasing a complexity of a digital signal process unit.

Or, the image removal filter can be configured so as to select, based on sub-carrier allocation information, a filter closest to a sub-carrier allocated to the apparatus itself from among a plurality of filters that are prepared.

This configuration enables to cope with the case even if a sub-carrier allocation to each user is changed, by selecting a filter closest to the sub-carrier band allocated to the apparatus itself from among a plurality of kinds of filters.

Also in the case of applying a band limit by using the image removal filter, the number of thin-outs, i.e., N/2, can be changed to N/4, N/8 and so on (where the denominator is a power of 2).

As such, applying N/4, N/8 and so on increases the number of loops and therefore a sub-carrier allocated to the wireless terminal apparatus itself tends to be overlapped with other signals. A combination with a band limit by a filter makes it possible to increase a chance of changing an FFT size.

The present invention is also contrived to allocate sub-carriers so as to prevent loop signals from overlapping if each wireless terminal apparatus (i.e., a user) changes an FFT size, when the base station carries out a sub-carrier allocation.

This configuration makes it possible for a receiver of the wireless terminal apparatus to increase a chance of changing an FFT size.

The present invention is also contrived in a manner that a base station allocates the same data to sub-carriers which become the relationship of a loop if an FFT size is changed, and thereby generates a signal by an N-point FFT.

This configuration improves an S/N ratio and reception sensitivity at the receiver of the wireless terminal apparatus.

BRIEF DESCRIPTION OF THE DRAWINGS

FIG. 1 is a conceptual diagram exemplifying a configuration of a reception process system of a wireless terminal apparatus embodying a control method therefor according to an embodiment of the present invention;

FIG. 3 is a conceptual diagram exemplifying a configuration of a down-link frame in an OFDMA transmission system according to an embodiment of the present invention;

FIG. 8 is a conceptual diagram showing, in terms of frequency range, a reception signal in the case of thinning out an FFT size at a wireless terminal apparatus receiving the down-link signal shown by FIG. 7;

FIG. 9 is a conceptual diagram showing, in terms of frequency range, a down-link signal transmitted from a base station at a certain clock time;

FIG. 10 is a conceptual diagram showing, in terms of frequency range, a reception signal in the case of thinning out an FFT size at a wireless terminal apparatus receiving the down-link signal shown by FIG. 9;

FIG. 12 is a conceptual diagram exemplifying a configuration of a reception system of a wireless terminal apparatus comprising an analog filter according to another embodiment of the present invention;

FIG. 13 is a conceptual diagram exemplifying a characteristic of an image filter such as a digital filter or an analog filter comprised by a wireless terminal apparatus according to an embodiment of the present invention;

FIG. 14 is a conceptual diagram showing, in terms of frequency range, a transmission signal in the case of thinning out an FFT size by applying an image filter to a down-link signal shown in FIG. 9;

FIG. 15 is a conceptual diagram showing a group of characteristics of image filters prepared in advance in the case of changing an FFT size from N points to N/2 points;

FIG. 17 is a flowchart describing an operation of a wireless terminal apparatus according to another embodiment of the present invention;

DESCRIPTION OF THE PREFERRED EMBODIMENTS

The following is a detailed description of the preferred embodiment of the present invention by referring to the accompanying drawings.

Figure 2:
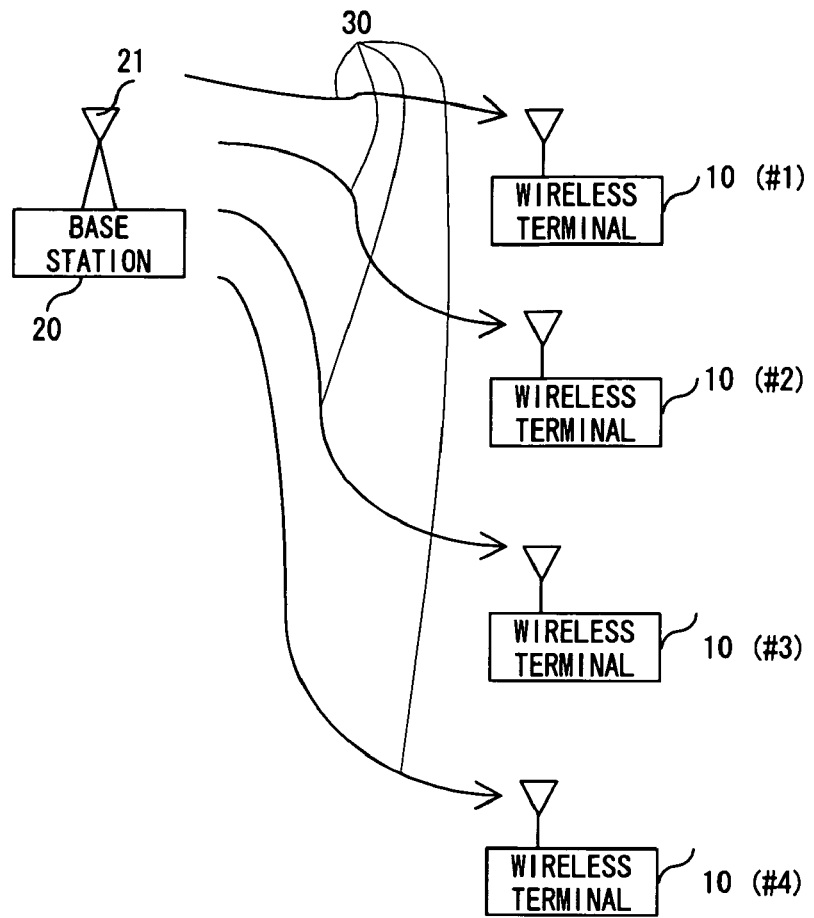
FIG. 2 is a conceptual diagram exemplifying a configuration of a wireless telecommunication system (i.e., an OFDMA transmission system) including a wireless terminal apparatus according to an embodiment of the present invention.

FIG. 1 is a conceptual diagram exemplifying a configuration of a reception process system of a wireless terminal apparatus embodying a control method therefor according to an embodiment of the present invention; and FIG. 2 is a conceptual diagram exemplifying a configuration of a wireless telecommunication system (i.e., an OFDMA transmission system) including a wireless terminal apparatus according to the present embodiment.

As exemplified by FIG. 2, the wireless telecommunication system according to the present embodiment includes a base station 20 and a plurality of wireless terminal apparatuses 10 (e.g., #1 through #4) under the management thereof.

As exemplified by FIG. 1, the reception process system of the wireless terminal apparatus 10 according to the present embodiment includes an antenna 11, a radio frequency (RF) reception unit 12, an A/D (analog-to-digital) conversion unit 13, a thin-out process unit 14, an S/P conversion unit 15a, a fast Fourier transform unit 15, a P/S conversion unit 15b, a demodulation process unit 16 and a judgment unit 17 (i.e., a judgment unit).

The antenna 11 receives a down-link frame 30 (i.e., a multi-carrier signal) coming from the base station 20.

The radio frequency (RF) reception unit 12, being constituted by an amplifier, a frequency converter, a band pass filter, an orthogonal demodulator, a low pass filter, et cetera (none of which is shown herein), converts the down-link frame 30 of a radio frequency into a baseband frequency.

The A/D conversion unit 13 is an A/D converter for converting an analog signal of the down-link frame 30 into a digital signal.

The thin-out process unit 14 performs a process of extracting sample points of a digital signal output from the A/D conversion unit 13 in a certain interval on an as required basis.

For instance, in the case of applying an N-point IFFT in the generation of a down-link frame 30 on the side of the base station 20 as later described, the present embodiment is configured in a manner that the thin-out process unit 14 makes the number of thin-outs an $N/2^m$ (where m=1, 2, 3 and so on), that is, resulting in N/2, N/4, N/8 and so on.

The fast Fourier transform unit 15 (i.e., an FFT) is a fast Fourier transformer.

The front and rear stages of the fast Fourier transform unit 15 is equipped with the S/P conversion unit 15a and P/S conversion unit 15b, respectively.

The S/P conversion unit 15a applies a serial/parallel conversion (S/P conversion) to a thinned out digital signal and input it to the fast Fourier transform unit 15.

The P/S conversion unit 15b applies a parallel/serial conversion (P/S conversion) to a plurality of sub-carriers output from the fast Fourier transform unit 15 and outputs it to the demodulation process unit 16.

The demodulation process unit 16 performs a demodulation process of a sub-carrier and transmits demodulated digital data to a host process unit (not shown herein).

The present embodiment is configured to equip the demodulation process unit 16 with a judgment unit 17.

The judgment unit 17 obtains sub-carrier allocation information of the wireless terminal apparatus 10 itself and another user (i.e., a wireless terminal apparatus 10) from information of a later described down-link map 32 included in the demodulated down-link frame 30 and judges a presence or absence of loop signals overlapping in the case of the thin-out process unit 14 carrying out a thin-out (i.e., a change of the number of points of an FFT). And it controls an operation of the thin-out process unit 14 by a thin-out control signal 14a according to the judgment result.

FIG. 3 is a conceptual diagram exemplifying a configuration of the down-link frame 30 in an OFDMA transmission system according to the present embodiment.

The down-link frame 30 according to the present embodiment is compliant to a frame configuration of a down-link signal contained by the standard specification of the IEEE 802.16-2004.

That is, the down-link frame 30 includes a preamble 31, a down-link map 32 and a plurality of sub-carriers 33.

There are four users existing in the example shown by FIG. 3, with down-link bursts #1, #2, #3 and #4, which are transmission data transmitted to each of #1 through #4 wireless terminal apparatuses 10, being respectively allocated to each of a plurality of sub-carriers 33.

The head of the down-link frame 30 is equipped with a preamble 31 which is used for a synchronization process, et cetera, followed by being equipped with a DL-MAP symbol (i.e., a down-link map 32) including sub-carrier allocation information for each user.

The present embodiment is configured to make the size (i.e., N points) of an inverse fast Fourier transform (IFFT), for generating a down-link frame 30 at a base station 20, N=2048 points. The down-link frame 30 is signal-generated by an IFFT of 2048 points at the base station 20.

The wireless terminal apparatus 10 first demodulates a symbol including a preamble 31 and one including a down-link map 32 (i.e., a DL-MAP) when receiving a down-link frame 30. The judgment unit 17 reads information of the DL-MAP from among these, thereby obtaining sub-carrier allocation information of the wireless terminal apparatus 10 itself and of other users (i.e., other wireless terminal apparatuses 10). The configuration also defines a band width of the down-link frame 30 as 20 MHz in the present embodiment.

Figure 4:
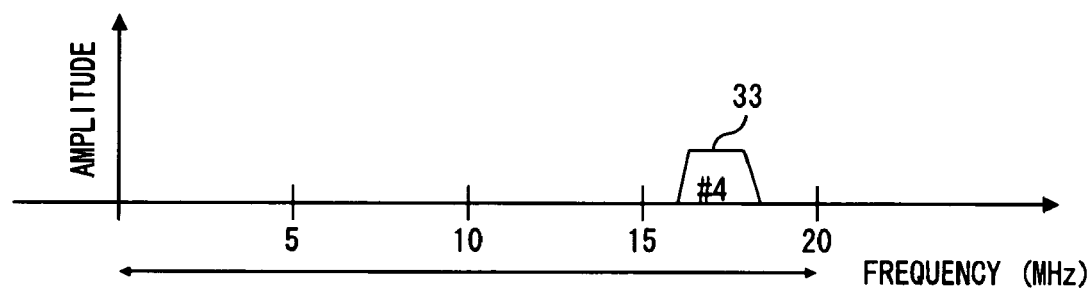
FIG. 4 is a conceptual diagram showing, in terms of frequency range, a down-link signal transmitted from a base station at a certain clock time.

FIG. 4 shows, in terms of frequency range, a down-link signal transmitted from a base station at a certain clock time T. Only a signal of the down-link burst #4 transmitted by the base station at a certain clock time T by addressing to the #4 wireless terminal apparatus 10 exists within a 20 MHz band, while a signal to other terminals do not exist.

Figure 5:
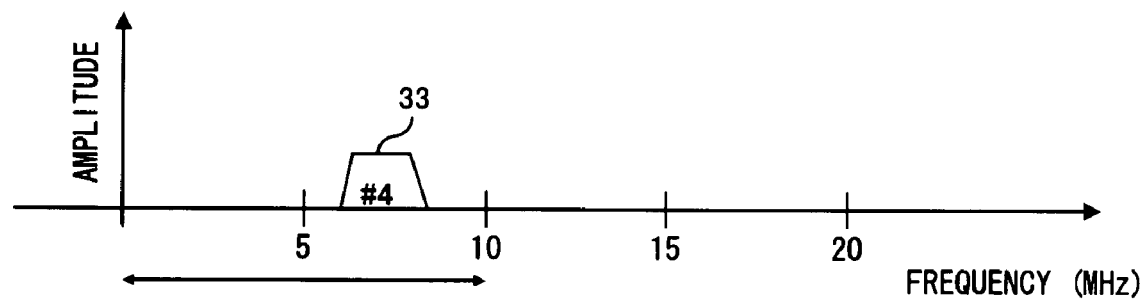
FIG. 5 is a conceptual diagram showing, in terms of frequency range, a reception signal in the case of thinning out an FFT size at a wireless terminal apparatus receiving the down-link signal shown by FIG. 4.

FIG. 5 shows, in terms of frequency range, a transmission signal in the case of receiving it with an FFT size of 1024 (=N/2) in place of 2048 at the wireless terminal apparatus 10. A loop signal of the down-link burst #4 appears between 0 and 10 MHz. Only a signal between 0 through 10 MHz is indicated, while a signal between 10 and 20 MHz is not indicated. Therefore, the demodulation process unit 16 applies a sub-carrier demodulation to the signal indicated between 0 and 10 MHz for decoding it in the #4 wireless terminal apparatus 10, thereby making it possible to obtain correct transmission data transmitted from the base station to the wireless terminal apparatus 10 itself through a 2028-point IFFT.

A signal generated by a transmitter of the base station applying an N-point IFFT to one OFDMA symbol is transmitted in the form of the one OFDMA symbol becoming N samples. Over at the reception process system of the wireless terminal apparatus 10, the radio frequency reception unit 12 (i.e., the RF unit) converts the signal received from the antenna 11 into a baseband signal, followed by the A/D conversion unit 13 (i.e., ADC) converting it into a digital signal. In the aforementioned digital signal, one OFDMA signal is formed by N samples and therefore by an application of an FFT thereto an N-point FFT is carries out.

The present embodiment is configured to apply an N/2-point FFT to an N-point FFT, and therefore the thin-out process unit 14 applies a thin-out process to the N samples of the digital signals made from one OFDMA symbol for converting them into N/2 samples of signals. This is followed by applying an FFT to the N/2 samples of signals, resulting in becoming N/2 points of FFT.

The reception process system of the wireless terminal apparatus 10 first receives a symbol including a down-link map (i.e., a DL-MAP) 32 of a down-link frame 30 using the same N-point with N-point FFT as that of the N-point IFFT on the transmission side for carrying out a decoding. This obtains information of bands (i.e., f1 through f4) of sub-carriers 33 which are allocated to the wireless terminal apparatus 10 itself and other users (i.e., wireless terminal apparatuses 10) (i.e., down-link bursts #1 through #4).

Then it judges, from band allocation information, whether or not transmission data of other users overlap with that of the apparatus itself even if the FFT size for the subsequent OFDMA symbols (i.e., sub-carriers 33) are changed to N/2 points. If the judgment is "no overlap", the thin-out process unit 14 thins out the number of sampling and changes, and receives, the FFT size to N/2 points for each of the subsequent OFDMA symbols.

Figure 6:
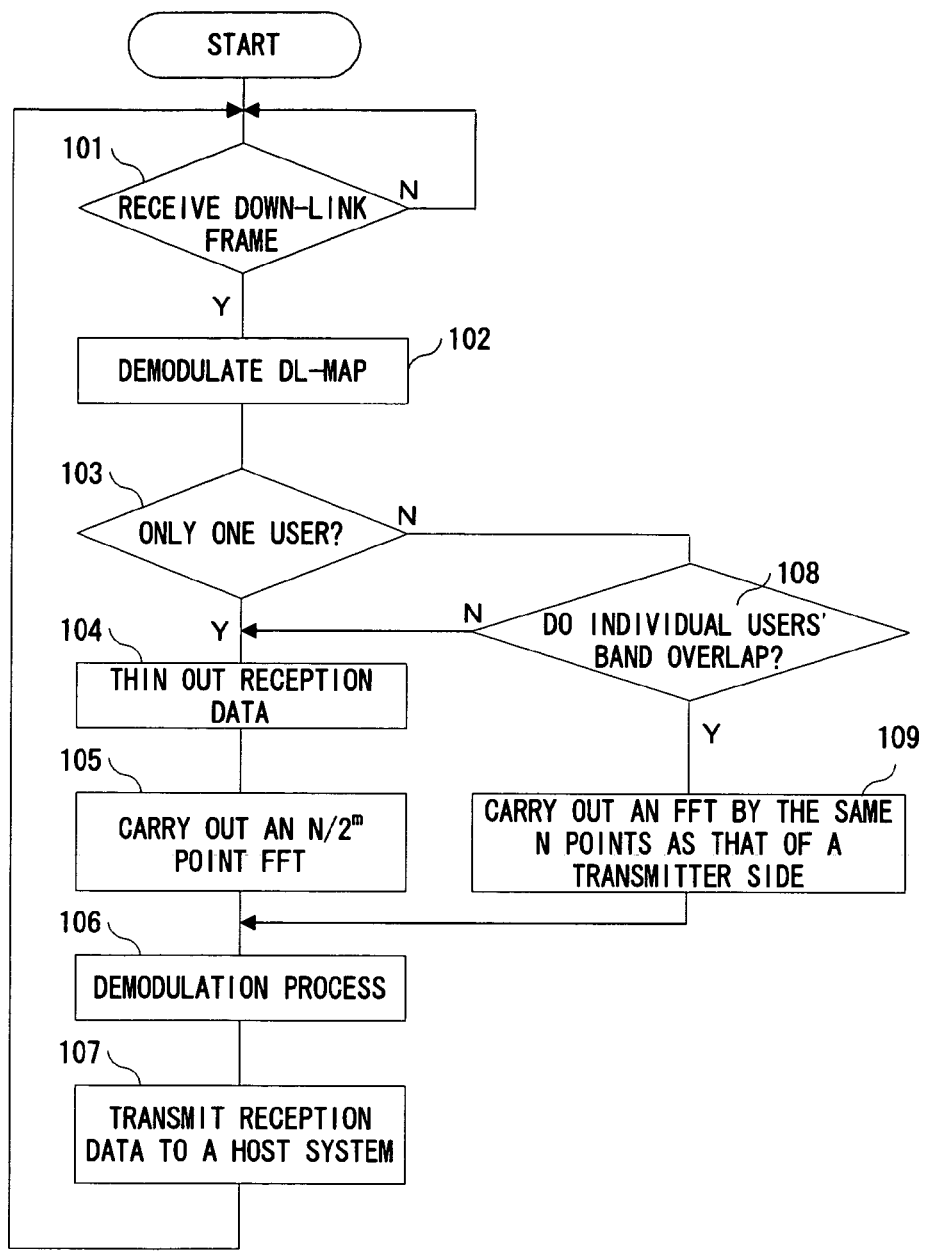
FIG. 6 is a flowchart describing an operation of a wireless terminal apparatus according to an embodiment of the present invention.

FIG. 6 is a flow chart describing the above described operation of the wireless terminal apparatus 10 according to the present embodiment.

Having received a down-link frame 30 (step 101), the wireless terminal apparatus 10 first demodulates a down-link map 32 using the same N points (i.e., 2048 points in this case) as an IFFT at the base station 20, thereby obtaining sub-carrier allocation information of the wireless terminal apparatus 10 itself and other wireless terminal apparatuses 10 (step 102).

Then the judgment unit 17 discerns whether there is only one user or not (i.e., whether or not only the present wireless terminal apparatus 10 exists under the management of the base station 20) (step 103).

If only one user exists as shown by FIG. 4, there is no concern over another user's data being overlapped by a loop signal, and accordingly the thin-out process unit 14 thins out a digital data sampling to a half for example (step 104), the fast Fourier transform unit 15 performs an FFT using 1024

(=N/2) points (step 105), thereby carrying out separation and demodulation of a plurality of sub-carriers 33 (step 106).

Then the wireless terminal apparatus 10 transmits the demodulated data of the down-link burst #4, which is addressed to the apparatus itself, to a host system within the wireless terminal apparatus 10 (step 107).

Contrarily, if a plurality of users is discerned to exist in the above described step 103, the judgment unit 17 discerns whether or not a band of a sub-carrier 33 of each user overlaps in a loop signal in the case of the thin-out process unit 14 carrying out a thin-out (step 108).

If an "overlap" is discerned, the wireless terminal apparatus 10 carries out an FFT at the fast Fourier transform unit 15 by the same N points (i.e., 2048 points in this case) as the IFFT of the base station 20 as the transmission origin (step 109).

If a "no overlap" of a loop signal is discerned in the above described step 108, it carries out a thin-out and an FFT of the number of points of the above described step 104.

Figure 7:
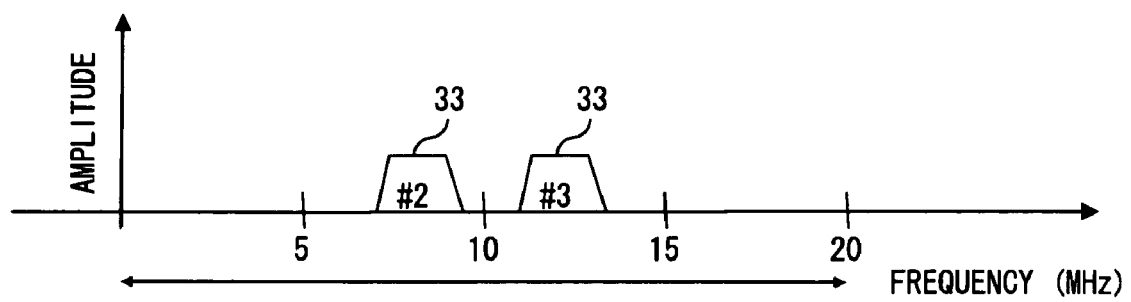
FIG. 7 is a conceptual diagram showing, in terms of frequency range, a down-link signal transmitted from a base station at a certain clock time.

That is, if only the down-link burst #2 and down-link burst #3 exist in the down-link frame 30 (transmission signal) from the base station 20 in the 20 MHz frequency range, as exemplified by FIG. 7, a reception signal in the case of the thin-out process unit 14 and fast Fourier transform unit 15 of the wireless terminal apparatus 10 applying an FFT by thinning out to 1024 points (=N/2) appears as the down-link burst #2 and down-link burst #3, respectively, without overlapping in a loop signal within the 0 through 10 MHz band as shown by a frequency range in FIG. 8.

In this case, each of the #2 and #3 wireless terminal apparatuses 10 judges that the down-link burst #2 or down-link burst #3 addressed to the terminal apparatus itself does not overlap with other users' signals and therefore able to receive it by changing the FFT size.

The present first embodiment enables reductions of the operation volume, calculation time and power consumption associated with a fast Fourier transform by thinning out the number of points therefor in a reception process for a multi-carrier signal such as a down-link frame 30 including a plurality of sub-carriers 33 at the wireless terminal apparatus 10.

That is, it enables an accomplishment of the performance improvement, such as a compact circuit size, an extended continuous operation time in the case of a battery operation, et cetera, of the wireless terminal apparatus 10.

Also the present first embodiment is configured to change the number of points for an FFT independently on the wireless terminal apparatus 10 side based on the sub-carrier allocation information stored by the down-link map 32 accompanying a down-link frame 30 transmitted from the base station 20, thereby accomplishing in a close loop within the wireless terminal apparatus 10 without requiring a specification change, et cetera, on the base station 20 side and providing high versatility.

The utilization of a loop of a signal by reducing the number of points for an FFT performed by the thin-out process unit 14 and fast Fourier transform unit 15 maintains a positional relationship of sub-carriers even if each user uses adjacent sub-carriers and/or even if sub-carriers are placed alternately, and therefore it is possible to apply to various sub-carrier allocation method.

Second Embodiment

The above described first embodiment has exemplified the case of restraining a thin-out process and carrying out an FFT (i.e., the above described step 108 and 109) at the fast Fourier transform unit 15 using the same N points as that of the IFFT at the transmitter side, if thinning out the number of points by the thin-out process unit 14 makes loop signals overlap with one another.

Comparably, the present second embodiment describes an example of removing a signal of another wireless terminal apparatus 10, which overlaps with a signal of the wireless terminal apparatus 10 by a loop signal, by using an image filter, thereby accomplishing a thin-out of the number of points at the thin-out process unit 14 and fast Fourier transform unit 15 even if loop signals overlap with one another.

That is, if the down-link burst #2 (i.e., f2) and down-link burst #4 (i.e., f4) exist in a transmission signal in terms of frequency range as exemplified in FIG. 9, and if the down-link burst #2 and down-link burst #4 appears in overlap at the position of the f2 of a loop signal within the 0 through 10 MHz band in the case of performing a 1024-point (=N/2) FFT at the wireless terminal apparatus 10 as exemplified in FIG. 10, it is not possible to receive a signal normally. Hence, the FFT size cannot be changed as is.

The present second embodiment accordingly applies an image filter for removing a signal of another wireless terminal apparatus 10 in the case of another user's signal overlapping with the band allocated to the wireless terminal apparatus 10 itself if an FFT size is changed.

Figure 11:
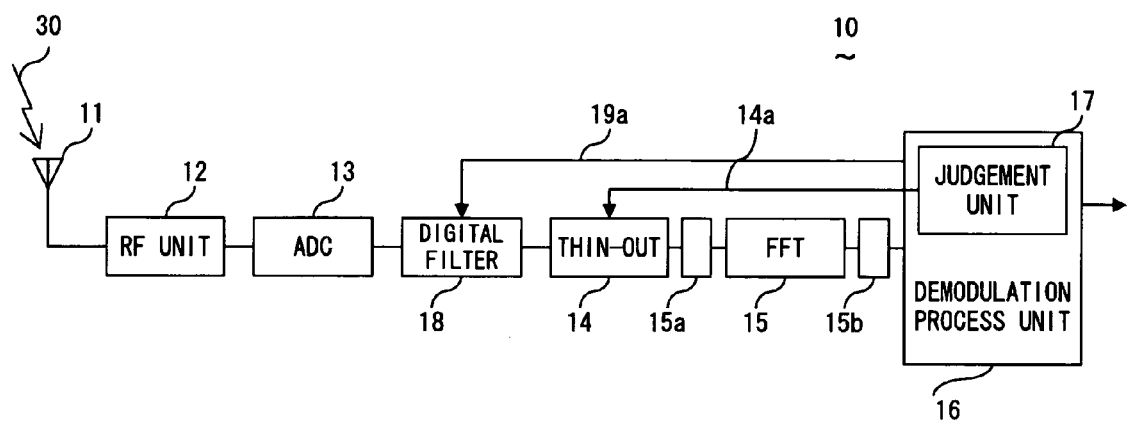
FIG. 11 is a conceptual diagram exemplifying a configuration of a reception system of a wireless terminal apparatus comprising a digital filter according to another embodiment of the present invention.

FIG. 11 exemplifies a configuration of a reception system of a wireless terminal apparatus 10 comprising a digital filter 18 for removing an image according to the present second embodiment.

The wireless terminal apparatus 10 is configured to insert a digital filter 18 between the A/D conversion unit 13 (ADC) and thin-out process unit 14 which are comprised by the reception process system exemplified by the above described FIG. 1.

And FIG. 12 exemplifies a configuration of a wireless terminal apparatus 10 comprising an analog filter 19 for removing an image. In the case of using the analog filter 19, it is inserted between the radio frequency reception unit 12 and A/D conversion unit 13 (ADC) which are comprised by the reception process system exemplified by the above described FIG. 1.

FIG. 13 exemplifies a characteristic of the digital filter 18 (or the analog filter 19) according to the present second embodiment. The digital filter 18 has a passband pf1 approximately 5 MHz to approximately 15 MHz including the band f2 of the down-link burst #3, while attenuating signals in other bands. The application of the digital filter 18 at the time of receiving the transmission signal (i.e., the down-link frame 30) shown in FIG. 9 passes a signal of the down-link burst #2 (i.e., f2) and attenuates that of the down-link burst #4 (i.e., f4).

FIG. 14 shows, in terms of frequency range, a transmission signal in the case of changing an FFT size from 2048 to 1024 after applying the digital filter 18. There is no signal overlapping with the down-link burst #2, making it possible to normally receive a signal.

That is, in the #2 wireless terminal apparatus 10, the control is such that the passband pf1 of the digital filter 18 comprehends the band f1 of the down-link burst #2, thereby making it possible to normally receive a signal without being affected by the down-link burst #4 which is addressed to another wireless terminal apparatus 10 even if the down-link frame 30 is in the state as shown by FIG. 9.

According to the IEEE 802.16-2004 and IEEE 802.16e, an integration of the down-link and up-link constitutes one frame. A wireless terminal apparatus 10 does not know which sub-carrier group (i.e., a sub-carrier 33) will be allocated until a reception of a down-link map 32 (i.e., DL-MAP). That is, the interrelation between the #1 through #4 and each of the wireless terminal apparatuses 10 has a possibility of changing for each down-link frame. And there is a possibility of an allocated band of a sub-carrier 33 changing for each frame.

Therefore, the reception process system of each wireless terminal apparatus 10 is desirably equipped with digital filters 18 (or analog filters 19) of various kinds of characteristics.

Upon receiving a down-link map 32 (i.e., a DL-MAP), thereby obtaining sub-carrier allocation information, and if the judgment is that a change of an FFT size causes a band allocated to the wireless terminal apparatus itself to be overlapped with another user's signal, then a band limit is carried out by selecting a filter having a passband closest to the band which is allocated to the apparatus itself from among the plurality of the equipped digital filters 18 or analog filters 19.

FIG. 15 shows a group of characteristics of digital-filters 18 or analog filters 19 prepared in advance in the case of changing an FFT size from N points to N/2 points.

FIG. 15 shows three kinds of filters, i.e., a low-pass filter (of a passband pf2), a band-pass filter (of a passband of pf1) and a high-pass filter (of a passband of pf3). FIG. 15 delineates the band-pass filter by dotted lines for easy identification. In this example, the passband pf2 of the low-pass filter and passband pf1 of the band-pass filter are overlapped with each other approximately by 5 MHz, and therefore it is possible to respond to any signal of a band width of 5 MHz no matter which band the aforementioned signal is allocated to. It is possible to respond to a signal of wider band by increasing the number of filters.

Figure 16:
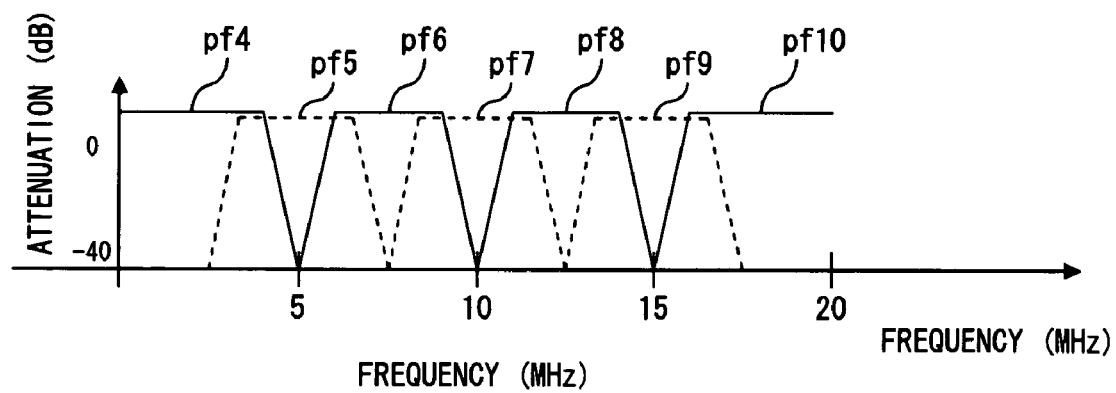
FIG. 16 is a conceptual diagram showing a group of characteristics of image filters prepared in advance in the case of changing FFT sizes from N points to N/4 points.

FIG. 16 shows a group of characteristics of digital filters 18 or analog filters 19 prepared in advance in the case of changing an FFT size from N points to N/4 points. FIG. 16 shows seven kinds of filters, i.e., a low-pass filter (of a passband pf4), five kinds of band-pass filters (of a passband pf5, a passband pf6, a passband pf7, a passband pf8 and a passband pf9) and a high-pass filter (of a passband pf10). Parts of band-pass filters are delineated by dotted lines for easy identification.

Note that a tunable filter allowing a variable passband may be used in the case of using an analog filter 19. In such a case, a passband of the analog filter 19 is variably controlled by inputting a band control signal 19a from the judgment unit 17 as exemplified in FIG. 12.

FIG. 17 is a flow chart exemplifying an operation of a wireless terminal apparatus 10 according to the present second embodiment. The description here is only for the part different from the above described FIG. 6.

In the flowchart shown by FIG. 17, in the case of individual users' bands overlapping (step 108), the digital filter 18 or analog filter 19 is controlled for carrying out band limit as the above described for sub-carrier 33 group that are reception data (step 120), which is different from the operation of the above described FIG. 6.

This configuration makes it possible to prevent an overlap of data addressed to the apparatus itself (e.g., the #2 wireless terminal apparatus 10 in the example shown in FIG. 14) with the #4 user's data in a loop signal even in the case of thinning out the number of points of an FFT at the thin-out process unit 14 and fast Fourier transform unit 15, and accurately receive a sub-carrier 33 addressed to the apparatus itself (i.e., the down-link burst #2 in this case) even in the case of thinning out the number of points at the fast Fourier transform unit 15.

Such application of a band limit by using an image removal filter such as the digital filter 18, analog filter 19, et cetera, makes it possible to further increase the number of thin-outs, to N/4, N/8, and so on, from N/2 for example without having a concern over an overlap of loop signals as a result of thinning out an FFT size at the fast Fourier transform unit 15.

That is, if the number of thin-outs increases to N/4, N/8 and so on, increasing the number of loops, thereby increasing a chance of the sub-carrier allocated to the wireless terminal apparatus 10 itself overlapping with another signal. However, the combination with a band limit by using an image filter such as the digital filter 18 and analog filter 19 as the present second embodiment makes an FFT size small, thereby increasing a possibility of reducing the operation volume, calculation time and power consumption of a fast Fourier transform.

In other words, it is possible to reduce the operation volume, calculation time and power consumption associated with a fast Fourier transform in a reception process for a multi-carrier signal (i.e., a down-link frame 30) at the wireless terminal apparatus 10 without being influenced by transmission signals for a plurality of wireless terminal apparatuses 10 or an allocation method for a plurality of sub-carrier signals 33.

Third Embodiment

The next description exemplifies a case of the base station 20 side allocating sub-carriers 33 (called a first allocation method) to individual users in a manner to avoid an overlap of loop signals by considering a thin-out of the number of points of an FFT at the thin-out process unit 14 and fast Fourier transform unit 15 of a wireless terminal apparatus 10 side.

Figure 18:
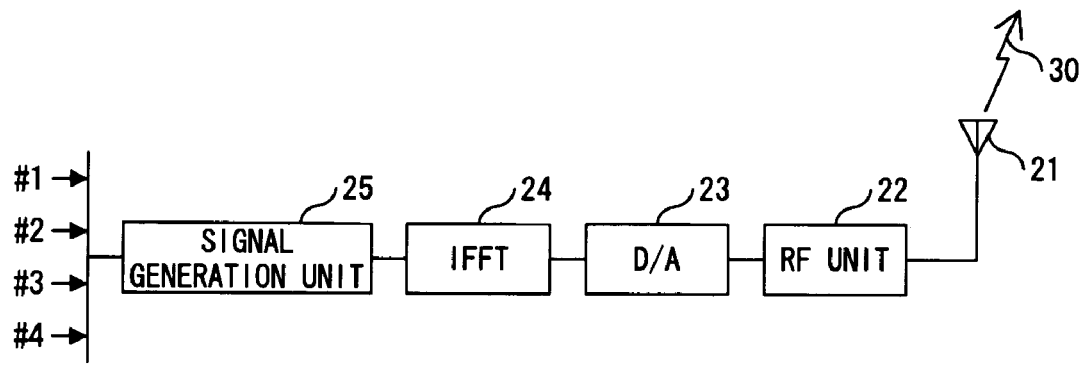
FIG. 18 is a conceptual diagram exemplifying a configuration of a base station according to an embodiment of the present invention.

FIG. 18 is a conceptual diagram exemplifying a configuration of a transmission process system at the base station 20 according to the present third embodiment.

The base station 20 comprises a transmission process system including an antenna 21, a radio frequency transmission unit 22 (i.e., RF unit), a D/A conversion unit 23, an inverse fast Fourier transform unit 24 and a signal generation unit 25.

The signal generation unit 25 performs the processes for allocating a plurality of digital transmission data #1 through #4 to respective bands of a plurality of sub-carriers 33 in a down-link frame 30 and modulating them, and for generating a preamble 31, a down-link map 32, et cetera.

The inverse fast Fourier transform unit 24 performs the process for converting to a time signal by applying an N-point inverse fast Fourier transform (IFFT) to a plurality of sub-carriers 33.

The D/A conversion unit 23 performs the process for converting a time signal generated by the inverse fast Fourier transform unit 24 to an analog signal.

The radio frequency transmission unit 22 performs the process for converting the analog signal to a radio frequency.

The antenna 21 emits a down-link frame 30 of a radio frequency toward the wireless terminal apparatus 10.

Figure 19:
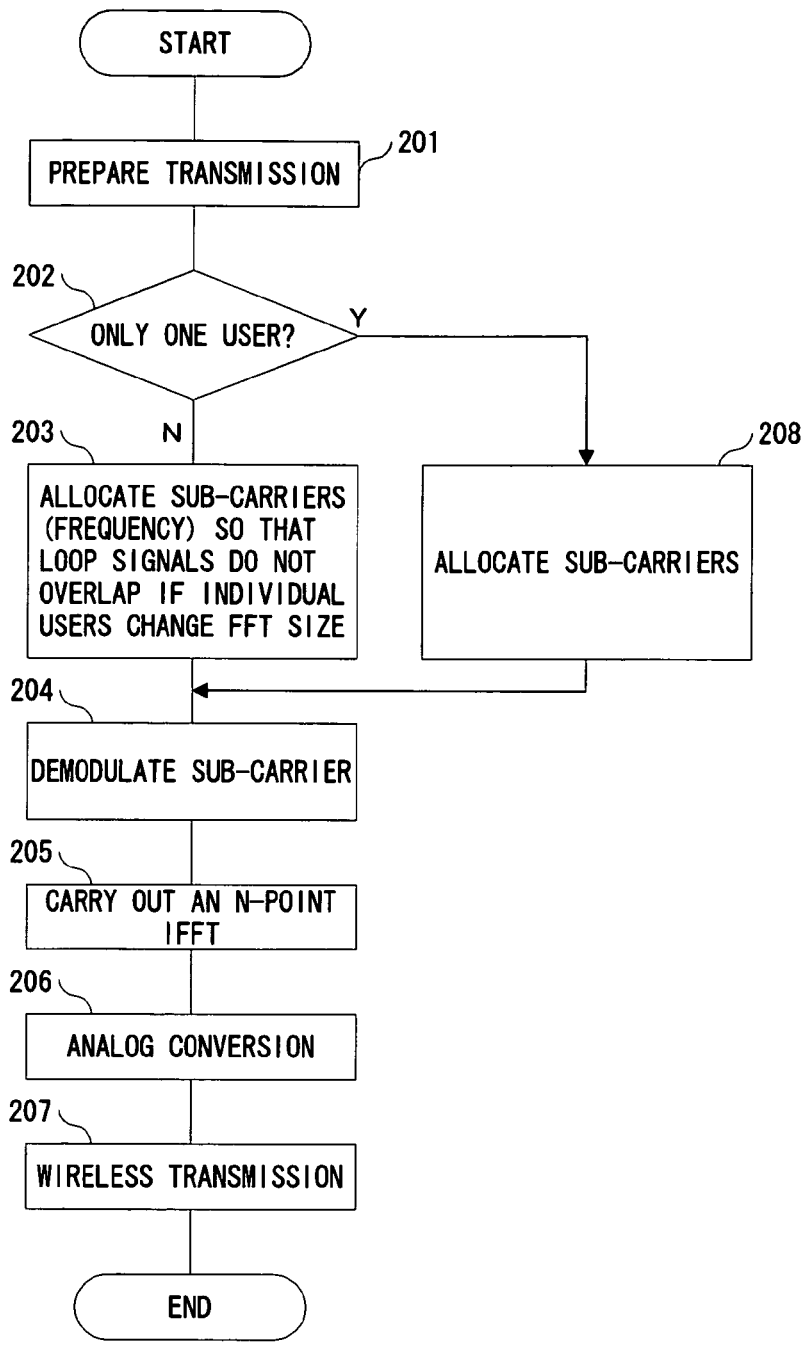
FIG. 19 is a flow chart describing an operation of a base station according to another embodiment of the present invention.

The next description is of an operation of the base station 20 according to the present third embodiment by referring to the flow chart shown by FIG. 19.

Having prepared transmission data (step 201), the signal generation unit 25 of the base station 20 discerns whether or not the number of user (i.e., a wireless terminal apparatus 10) is only one (step 202).

If a plurality of users (i.e., wireless terminal apparatuses 10) exists, the base station 20 allocates a sub-carrier 33 so that the individual users' data (e.g., the down-link burst #3 and down-link burst #4) do not overlap by loop signals even if the number of points of an FFT is thinned out from the value at the time of a transmission at the fast Fourier transform unit 15 (step 203) in each of the wireless terminal apparatuses 10.

Then, it carries out a modulation of the sub-carrier (step 204), followed by the inverse fast Fourier transform unit 24 carrying out an N (2048)-point IFFT (step 205), the D/A conversion unit 23 converting into an analog signal (step 206), the radio frequency transmission unit 22 converting into a radio frequency and the antenna 21 transmitting toward the wireless terminal apparatus 10 as a down-link frame 30 (step 207).

Meanwhile, if only one user exists in the above described step 202, the base station 20 allocates transmission data of the aforementioned user to a discretionary sub-carrier 33 (step 208). This case corresponds to the cases of the above described FIGS. 4 and 5, in which there is no concern over a loop signal overlapping in the wireless terminal apparatus 10 no matter which sub-carrier the transmission data is allocated to.

Figure 20:
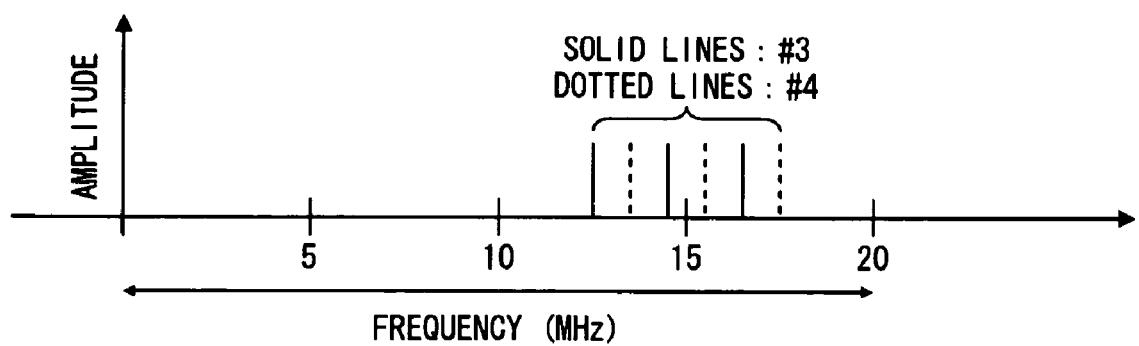
FIG. 20 is a conceptual diagram showing, in terms of frequency range, a down-link signal transmitted from a base station according to an embodiment of the present invention.

The present third embodiment is configured so that the signal generation unit 25 of the base station 20 allocates transmission data alternately to the sub-carriers 33 in the above described step 203 in a manner that the sub-carrier 33 of the down-link burst #3 and that of the down-link burst #4 of the transmission signal are placed side by side and alternately as shown in the frequency range by FIG. 20.

Figure 21:
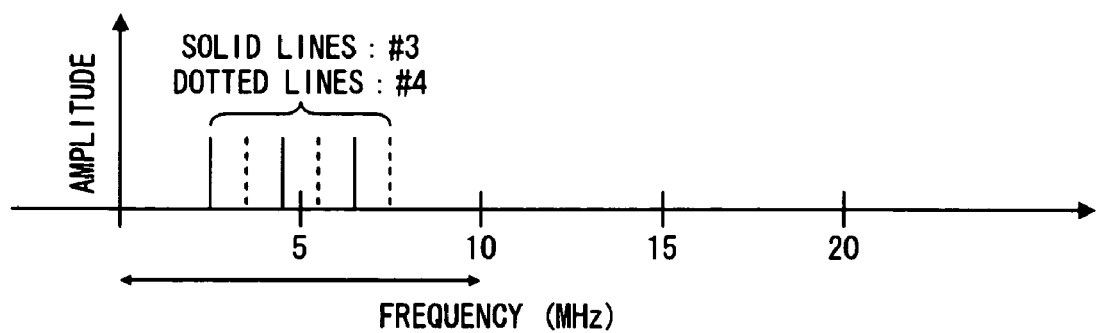
FIG. 21 is a conceptual diagram showing, in terms of frequency range, a reception signal in the case of thinning out an FFT size at a wireless terminal apparatus receiving the down-link signal shown by FIG. 20.

FIG. 21 shows, in terms of frequency range, a reception signal in the case of carrying out a 1024 (=N/2)-point FFT at the reception process system of the wireless terminal apparatus 10 for the down-link burst #3 and down-link burst #4 to both of which sub-carriers 33 are allocated as shown by FIG. 20.

As in the case of the original FIG. 20, in which an adjacent sub-carrier is allocated to each user, the down-link burst #3 of a loop signal and the down-link burst #4 within the 0 through 10 MHz band, and therefore the #4 (or #3) wireless terminal apparatus 10 can normally receive the signal of the down-link burst #4 (or #3) addressed to the apparatus itself.

That is, a change of an FFT size at a wireless terminal apparatus 10 side receiving a down-link frame 30 increases a possibility of accomplishing a reduction of the operation volume, calculation time and power consumption associated with a fast Fourier transform.

Fourth Embodiment

The next description is of an example (i.e., a second allocation method), as the fourth embodiment, for improving an S/N ratio of a reception signal by a base station 20 allocating the same data to sub-carriers 33 overlapping with one another by loop signals by utilizing the fact that a change of an FFT size at a wireless terminal apparatus 10 side causes a signal to overlap by a loop signal.

Figure 22:
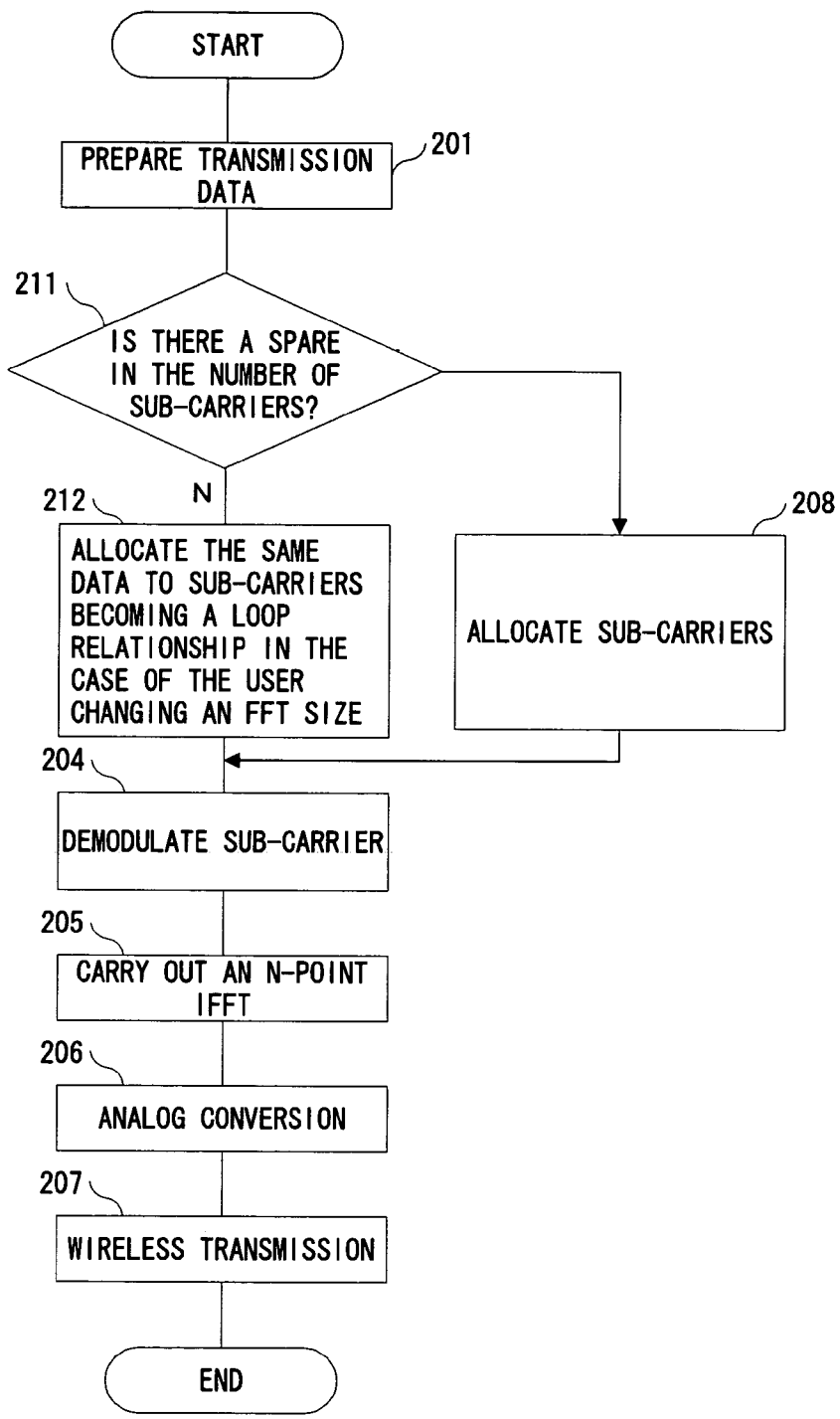
FIG. 22 is a flow chart describing an operation of a base station according to another embodiment of the present invention.

The configuration of the base station 20 is the same as the case of the above described third embodiment. FIG. 22 exemplifies a flow chart in the case of the fourth embodiment.

The flow chart shown by FIG. 22 differs from FIG. 19 in carrying out the steps 211 and 212 in place of the steps 202 and 203 of the FIG. 19.

Figure 23:
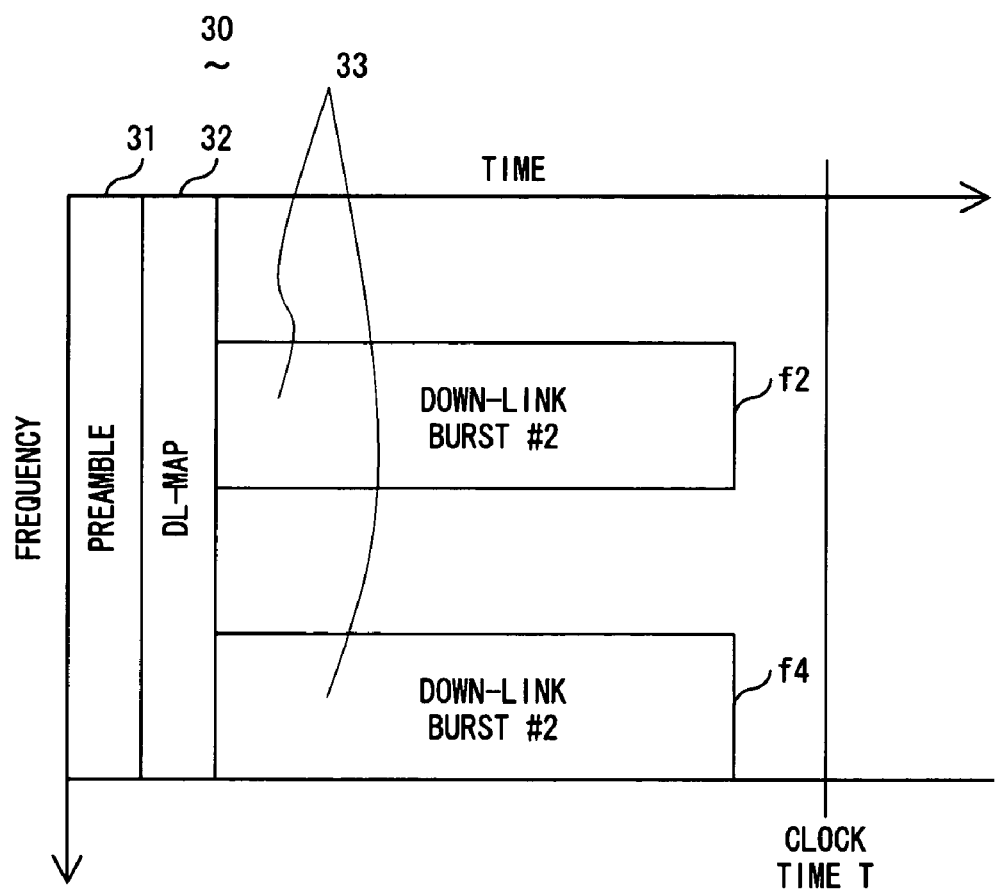
FIG. 23 is a conceptual diagram exemplifying a configuration of a down-link frame in the case of allocating the same data to two sub-carriers.

That is, if there is a spare in sub-carriers 33 (step 211), the signal generation unit 25 of the base station 20 allocates the same data of the down-link burst #2 to two sub-carriers 33 of a down-link frame 30 as shown in FIG. 23 (step 212). The two sub-carriers 33 are placed in an overlap position by a loop when the thin-out process unit 14 and fast Fourier transform unit 15 of the wireless terminal apparatus 10 change an FFT size (i.e., the number of points).

Figure 24:
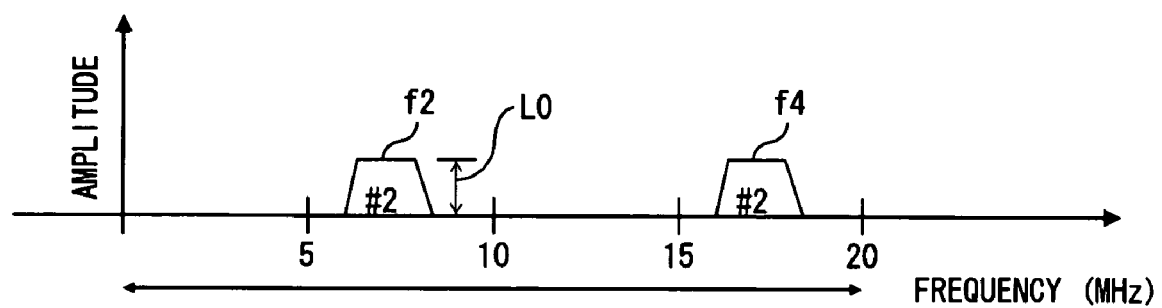
FIG. 24 is a conceptual diagram showing, in terms of frequency range, of a down-link signal to which the same data is allocated to a plurality of sub-carriers.

Such placed plurality of down-link bursts #2 in the original form is dispersively received by the wireless terminal apparatus 10 in the direction of the frequency axis with the amplitude of L0 as exemplified by FIG. 24.

Figure 25:
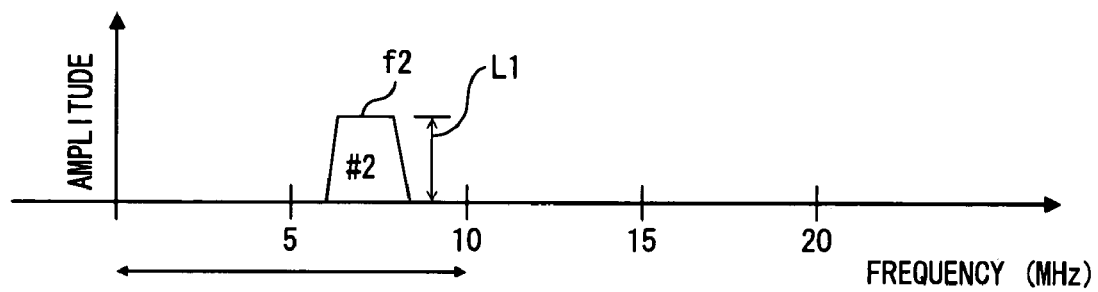
FIG. 25 is a conceptual diagram showing, in terms of frequency range, a reception signal in the case of thinning out an FFT size at a wireless terminal apparatus receiving the down-link signal shown by FIG. 24.

Meanwhile, FIG. 25 shows a reception signal in terms of frequency range when receiving it by the wireless terminal apparatus 10 changing the FFT size from 2048 (=N) points, of the base station 20, to 1024 (=N/2) points. It is understood that a signal power (i.e., an amplitude L1) of the down-link burst #2 becomes larger than the original value (i.e., the amplitude L0 shown in FIG. 24) by overlapping as a result of looping within the 10 MHz band, thereby improving an S/N ratio and reception sensitivity.

Note that the present invention can apparently be changed in various ways possible within the scope thereof, in lieu of being limited by the configurations exemplified in the above described embodiments.

The present invention enables a reduction of the operation volume, calculation time and power consumption associated with a fast Fourier transform in a reception process for a multi-carrier signal at a wireless terminal apparatus.

The present invention also enables a reduction of the operation volume, calculation time and power consumption associated with a fast Fourier transform in a reception process for a multi-carrier signal in a wireless terminal apparatus without being influenced by transmission signals to a plurality of wireless terminal apparatuses or an allocation method of for a plurality of sub-carriers.

The present invention also enables an accomplishment of improving reception sensitivity in a reception process for a multi-carrier signal at a wireless terminal apparatus.

What is claimed is:

1. A wireless terminal apparatus, including:
    a reception unit for receiving a multi-carrier signal generated by applying an N-point (where N is a natural number) inverse fast Fourier transform (IFFT) to a plurality of sub-carriers to which transmission information for a plurality of wireless terminal apparatuses is allocated;
    a fast Fourier transform unit for extracting a plurality of the sub-carriers from the multi-carrier signal;
    a thin-out unit, being placed at the front stage of the fast Fourier transform unit, capable of changing, from the N points, a sampling number of the multi-carrier signal which is digitalized; and
    a judgment unit for discerning, based on sub-carrier allocation information accompanying the multi-carrier signal, whether or not the sub-carrier of another wireless terminal apparatus overlaps with that of the wireless terminal apparatus itself in the case of changing the sampling number from the N points, and determining a sampling number for the thin-out unit.

2. The wireless terminal apparatus according to claim 1, wherein
    said judgment unit sets said sampling number for said thin-out unit to N/2m points (where m is a natural number of 1 or greater) when said sub-carrier of another wireless terminal apparatus does not overlap with those of the wireless terminal apparatus itself when determining the sampling number at the N/2m points.

3. The wireless terminal apparatus according to claim 1, further comprising
    a filter unit, on the upstream side of said thin-out unit, for limiting a band of said multi-carrier signal so as to selectively pass said sub-carrier signal allocated to the wireless terminal apparatus itself.

4. The wireless terminal apparatus according to claim 1, wherein
    said filter unit is constituted by a digital filter.

5. The wireless terminal apparatus according to claim 1, wherein
said filter unit is constituted by an analog filter.

6. A control method for a wireless terminal apparatus, comprising:
a first step for receiving a multi-carrier signal generated by applying an N-point inverse fast Fourier transform (IFFT) to a plurality of sub-carriers to which transmission information for a plurality of wireless terminal apparatuses is allocated, where N is a natural number;
a second step for obtaining sub-carrier allocation information accompanying the multi-carrier signal; and
a third step for changing a sampling number of the multi-carrier signal from the N points by a thin-out unit which is placed at the front stage of the fast Fourier transform unit and discerning, using sub-carrier allocation information accompanying the multi-carrier signal, whether the sub-carrier of another wireless terminal apparatus overlaps with that of the wireless terminal apparatus itself in the case of changing the sampling number from the N points by applying a fast Fourier transform (FFT) to the multi-carrier signal.

7. The control method for a wireless terminal apparatus according to claim 6, wherein
said third step thins out said sampling number to N/2m points (where m is a natural number of one or greater) when a loop signal of each of said sub-carriers does not overlap when changing the sampling number from said N points to the N/2m points.

8. The control method for a wireless terminal apparatus according to claim 6, wherein
said third step thins out said sampling number to N/2m points (where m is a natural number of one or greater) after applying a band limit to said multi-carrier signal so as to selectively pass a specific of said sub-carriers when a loop signal of each of the sub-carriers overlaps when changing the sampling number from said N points to the N/2m points.

9. The control method for a wireless terminal apparatus according to claim 8,
applying said band limit by using a digital filter or an analog filter.

* * * * *